United States Patent
Kim et al.

(10) Patent No.: US 10,711,074 B2
(45) Date of Patent: Jul. 14, 2020

(54) SUPER ABSORBENT POLYMER AND METHOD FOR PREPARING SAME

(71) Applicant: LG Chem, Ltd., Seoul (KR)

(72) Inventors: Ju Eun Kim, Daejeon (KR); Gi Cheul Kim, Daejeon (KR); Sung Soo Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/319,057

(22) PCT Filed: Jan. 23, 2018

(86) PCT No.: PCT/KR2018/001012
§ 371 (c)(1),
(2) Date: Jan. 18, 2019

(87) PCT Pub. No.: WO2018/135928
PCT Pub. Date: Jul. 26, 2018

(65) Prior Publication Data
US 2020/0123281 A1     Apr. 23, 2020

(30) Foreign Application Priority Data
Jan. 23, 2017   (KR) .................. 10-2017-0010606
Jan. 22, 2018   (KR) .................. 10-2018-0007962

(51) Int. Cl.
| | | |
|---|---|---|
| *C08F 2/44* | (2006.01) | |
| *C08F 220/28* | (2006.01) | |
| *C08K 3/34* | (2006.01) | |
| *B01J 20/26* | (2006.01) | |
| *C08F 236/02* | (2006.01) | |

(52) U.S. Cl.
CPC ............... *C08F 2/44* (2013.01); *B01J 20/261* (2013.01); *C08F 220/28* (2013.01); *C08F 236/02* (2013.01); *C08K 3/34* (2013.01); *B01J 2220/68* (2013.01)

(58) Field of Classification Search
CPC ........ C08F 2/44; C08F 220/28; C08F 236/02; B01J 20/261; B01J 2220/68; C08K 3/34
USPC ....................................................... 502/402
See application file for complete search history.

(56) References Cited

U.S. PATENT DOCUMENTS

| | | |
|---|---|---|
| 2005/0239942 A1 | 10/2005 | Herfert et al. |
| 2010/0100066 A1 | 4/2010 | Azad et al. |
| 2010/0210746 A1 | 8/2010 | Gustafson et al. |
| 2012/0035294 A1 | 2/2012 | Kim et al. |
| 2014/0213674 A1 | 7/2014 | Al-Ghamdi et al. |
| 2017/0009026 A1 | 1/2017 | Nam et al. |
| 2017/0361305 A1 | 12/2017 | Kim et al. |
| 2018/0237593 A1 | 8/2018 | Nam et al. |

FOREIGN PATENT DOCUMENTS

| | | |
|---|---|---|
| EP | 3406654 A2 | 11/2018 |
| JP | 2002336694 A | 11/2002 |
| JP | 2005536598 A | 12/2005 |
| JP | 2010235781 A | 10/2010 |
| KR | 20100076980 A | 7/2010 |
| KR | 20110006771 A | 1/2011 |
| KR | 20110086057 A | 7/2011 |
| KR | 20130018350 A | 2/2013 |
| KR | 20140074906 A | 6/2014 |
| KR | 20160016645 A | 2/2016 |
| KR | 20170043838 A | 4/2017 |
| WO | 2014094892 A1 | 6/2014 |
| WO | 2016085163 A1 | 6/2016 |

OTHER PUBLICATIONS

Search report from International Application No. PCT/KR2018/001012, dated Jun. 4, 2018.
Chen, Yi, et al., "Effect of AMPS and Clay on the Acrylic Acid Based Superabsorbent Hydrogels." Applied Mechanics and Materials, vols. 427-429, Sep. 27, 2013, pp. 364-367.
Schwalm, Reinhold, "UV Coatings: Basics, Recent Developments and New Applications." Esevier Science, Dec. 21, 2006, p. 115.
Odian, George, "Principles of Polymerization." Second Edition, 1981, John Wiley & Sons, Inc., p. 203.
Extended European Search Report including Written Opinion for EP18741398.4 dated Jul. 22, 2019.

*Primary Examiner* — Edward M Johnson
(74) *Attorney, Agent, or Firm* — Lerner, David, Littenberg, Krumholz & Mentlik, LLP

(57) ABSTRACT

The present invention relates to a super absorbent polymer and a method for preparing the same. According to the super absorbent polymer and the method for preparing a super absorbent polymer of the present invention, a laponite is contained in a colloidal solution state during polymerization of the monomer composition, and thus achieves an appropriate crosslinking density, thereby contributing to improvement of various physical properties such as a gel strength and a centrifuge retention capacity of the super absorbent polymer.

19 Claims, 2 Drawing Sheets

[FIG. 1]
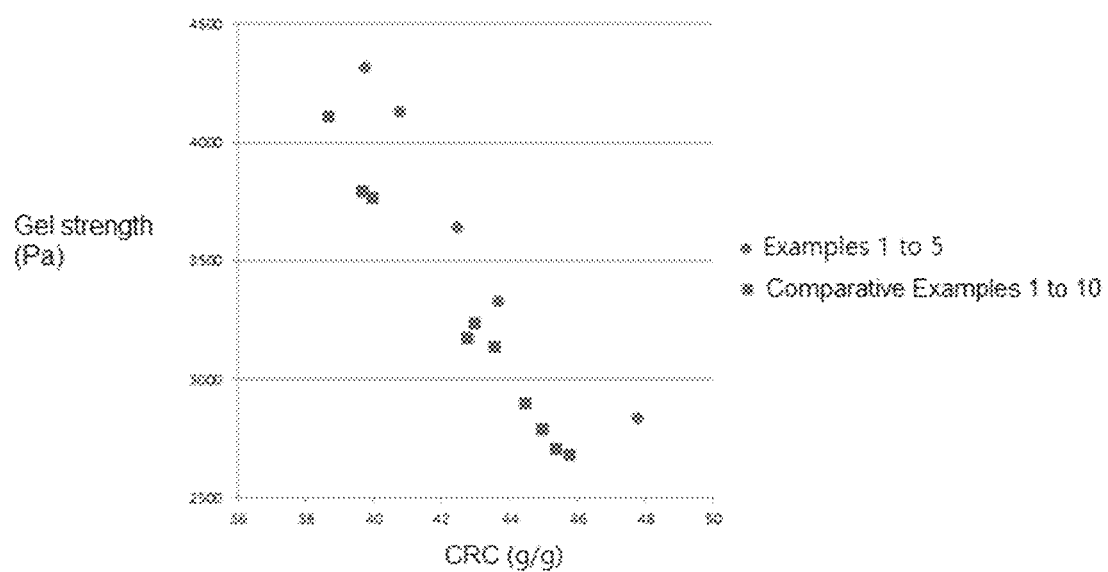

[FIG. 2]
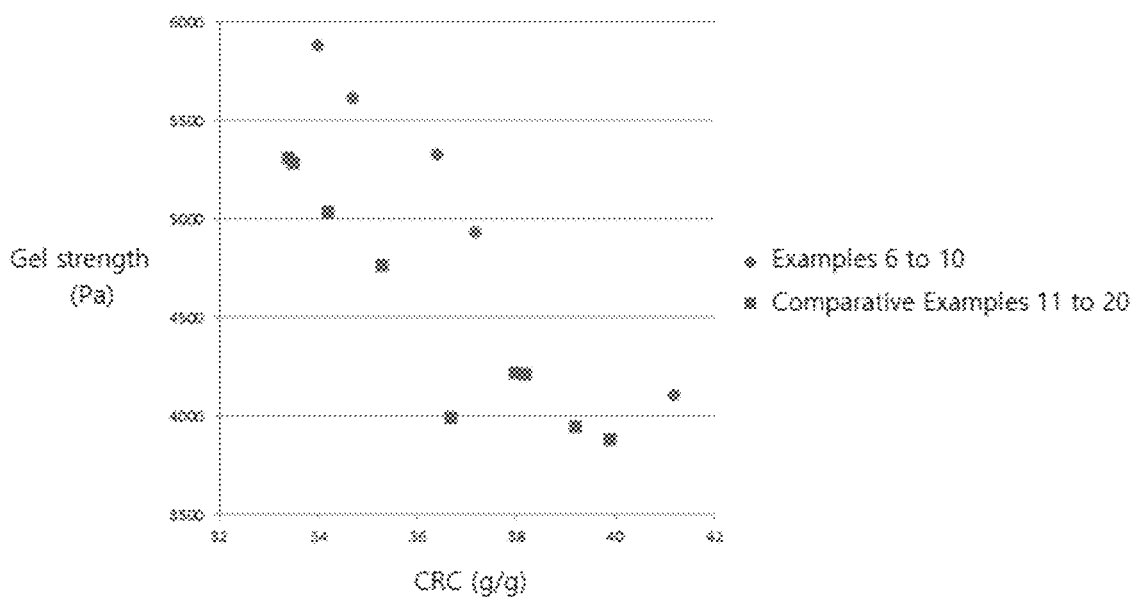

SUPER ABSORBENT POLYMER AND METHOD FOR PREPARING SAME

CROSS-REFERENCE TO RELATED APPLICATION(S)

This application is a national phase entry under 35 U.S.C. § 371 of International Application No. PCT/KR2018/001012, filed Jan. 23, 2018, which claims priority to Korean Patent Application No. 10-2017-0010606, filed Jan. 23, 2017, and Korean Patent Application No. 10-2018-0007962, filed Jan. 22, 2018, the disclosures of which are incorporated herein by reference.

BACKGROUND OF THE INVENTION

(1) Field of the Invention

The present invention relates to a super absorbent polymer and a method for preparing the same.

(2) Description of the Related Art

Super absorbent polymer (SAP) is a synthetic polymer material capable of absorbing moisture from about 500 to about 1,000 times its own weight, began to be commercialized as sanitary items, and currently, it is being widely used as hygienic goods such as paper diapers for children or sanitary napkins, water retaining soil products for gardening, water stop materials for the civil engineering and construction, sheets for raising seedling, fresh-keeping agents for food distribution fields, materials for poultice or the like.

Super absorbent polymer uses water soluble ethylenically unsaturated monomers, and as the water soluble ethylenically unsaturated monomers, one or more monomers selected from the group consisting of anionic monomers and salts thereof, nonionic hydrophilic group containing monomers, and amino group containing unsaturated monomers and quarternized products thereof may be used. A solution wherein water soluble ethylenically unsaturated monomers are neutralized with an alkali metal salt such as a sodium salt or a basic compound such as caustic soda, which comprises a cross-linking agent and a polymerization initiator and can be polymerized, is referred to as a monomer composition. The monomer composition is thermally polymerized or photo-polymerized to prepare hydrogel polymer, which is then dried, pulverized and classified to prepare a powder product.

In order to improve the centrifuge retention capacity (CRC) and the absorption under pressure (AUP) of the super absorbent polymer, various crosslinking agents may be added to the insider or the outside of the super absorbent polymer, and in general, an organic crosslinking agent having a functional group capable of reacting with the water soluble substituent of the water soluble ethylenically unsaturated monomers is used.

Recently, attempts was made to use nanoclay as the crosslinking agent of super absorbent polymer, however, due to the low reactivity between the surface hydroxyl group of nanoclay and the super absorbent polymer, cross-linkability is lowered, and in the case where nanoclay is introduced into a monomer composition for preparing a super absorbent polymer, due to the high ion concentration of alkali metal salts or basic compounds introduced for neutralization, nanoclay particles tend to aggregate with each other. And, the monomer composition has a pH value in the range of 5 to 7, but it is known that, in the above pH range, nanoclay is unstable and thus aggregation is induced.

As such, due to the high ion concentration and pH of a monomer composition, nanoclay has poor dispersibility in the monomer composition, and aggregation of nanoclay occurs to make the monomer composition opaque and increase the viscosity. In case the dispersibility of nanoclay in the monomer composition is poor and aggregation occurs, a centrifuge retention capacity and an absorption under pressure of the super absorbent polymer may be rather decreased, and in case where the monomer composition is opaque, due to low UV transmittance, the degree of polymerization may be lowered at the time of UV polymerization.

Because of the high ionic concentration and pH of the monomer composition, there is a problem that the nanoclay has poor dispersibility in the monomer composition. Therefore, a method of adding a nanoclay treated with a dispersant to improve the dispersibility or a method of using a nanoclay modified by introducing a functional group such as a (meth)acrylate functional group on the surface or edge of the nanoclay has been studied.

For example, Korean Patent Laid-open Publication No. 2016-0016645 discloses a method for preparing a polymer by adding modified nanoclay on the surface or edge of which (meth)acrylate functional groups are introduced, during the polymerization. However, according to the above method, since the process of modification is required before using nanoclay, the process steps become complicated, and consequently, the production cost is increased and it is difficult to be practically applied to a mass production process.

In addition, if nanoclay treated with a dispersant is added so as to improve dispersibility, although dispersibility in the monomer composition is provided, it is difficult to use in super absorbent polymer because surplus dispersant floats.

Korean Patent Laid-open Publication No. 2013-0018350 discloses a method for preparing a super absorbent polymer which comprises thermally polymerizing or UV polymerizing a monomer composition containing a water soluble ethylenically unsaturated monomers and a non-reactive fine particle having a diameter of 20 nm to 1 mm. According to the above method, it is disclosed that water or heat in the super absorbent polymer can be smoothly discharged to obtain a super absorbent polymer having a low moisture content and a low temperature, and the centrifuge retention capacity (CRC) and the absorption under pressure (AUP) can be improved together.

However, according to the above method, a large amount of non-reactive fine particles must be used, resulting in an increase in the unit cost of production and it is difficult to be practically applied to a mass production process.

PRIOR ART LITERATURE

Patent Literature (Patent Literature 1) Korean Patent Laid-open Publication No. 2013-0018350A (Patent Literature 2) Korean Patent Laid-open Publication No. 2016-0016645A

SUMMARY OF THE INVENTION

For resolving the aforesaid problems of the prior arts, it is an object of the present invention to provide a super absorbent polymer exhibiting high crosslinking density and improved physical properties while enhancing the dispersibility of nanoclay, and a method for preparing the same.

To achieve the above object, one aspect of the present invention provides a method for preparing a super absorbent polymer comprising the steps of:

preparing a monomer composition containing a water soluble ethylenically unsaturated monomer, an internal crosslinking agent, and a polymerization initiator;

mixing the monomer composition with a laponite colloidal solution containing 0.02 to 0.09 part by weight of a positively charged laponite based on 100 parts by weight of the monomer composition; and thermally polymerizing or photo-polymerizing the mixture of the monomer composition and the laponite colloidal solution to form a crosslinked polymer.

Also, one aspect of the present invention provides a super absorbent polymer formed by polymerizing a mixture of a monomer composition containing a water soluble ethylenically unsaturated monomer, an internal crosslinking agent, and a polymerization initiator; and a laponite colloidal solution containing 0.02 to 0.09 part by weight of a positively charged laponite based on 100 parts by weight of the monomer composition.

According to the super absorbent polymer and the method for preparing the same of the present invention, a positively charged laponite is contained in a colloidal solution state during polymerization of the monomer composition, and thus the laponite forms a double crosslinking structure together with other internal crosslinking agents in the process of preparing the crosslinked polymer and achieves an appropriate crosslinking density, thereby contributing to improvement of various physical properties such as a gel strength, a centrifuge retention capacity, an absorption under pressure and a liquid permeability of the super absorbent polymer. In addition, as the positively charged laponite is added in a colloidal solution state instead of a particle state, the effect of improving the physical properties can be achieved with only a small amount of laponite.

Moreover, the laponite colloidal solution has good dispersibility in the monomer composition and does not inhibit the polymerization process, thereby achieving high process efficiency.

Further, the laponite colloidal solution of the present invention can maintain transparency and dispersibility in the monomer composition without pretreatment such as modification, and consequently contribute to improvement of physical properties of the super absorbent polymer.

BRIEF DESCRIPTION OF THE DRAWINGS

FIG. 1 is a graph showing the relationship between the centrifuge retention capacity and the gel strength of the crosslinked polymers of Examples and Comparative Examples of the present invention.

FIG. 2 is a graph showing the relationship between the centrifuge retention capacity and the gel strength of the super absorbent polymers of Examples and Comparative Examples of the present invention.

DETAILED DESCRIPTION OF THE EMBODIMENTS

Terms used herein are used only to describe particular embodiments only and is not intended to be limiting of the invention. As used herein, singular expressions "a," "an" and "the" are intended to include plural expressions as well, unless the context clearly indicates otherwise. Also, it should be understood that the terms "comprise," "include", "have", etc. as used herein specify the presence of stated features, steps, components or combinations thereof, but do not preclude the presence or addition of one or more other features, steps, components, or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a super absorbent polymer according to a specific embodiment of the present invention and a preparation method thereof will be described in detail.

The method for preparing a super absorbent polymer according to one embodiment of the present invention comprises the steps of: preparing a monomer composition containing a water soluble ethylenically unsaturated monomer, an internal crosslinking agent, and a polymerization initiator; mixing the monomer composition with a laponite colloidal solution containing 0.02 to 0.09 part by weight of a positively charged laponite based on 100 parts by weight of the monomer composition; and thermally polymerizing or photo-polymerizing the mixture of the monomer composition and the laponite colloidal solution to form a crosslinked polymer.

For reference, in the present specification, the "crosslinked polymer" or "polymer" means that the water-soluble ethylenically unsaturated monomer is in a polymerized state, and may include those of all moisture content range or particle size ranges. Among the crosslinked polymers, the crosslinked polymer having a moisture content (water content) of about 40 wt % or more during polymerization, after polymerized and before dried may be referred to as a hydrogel polymer. Further, among the crosslinked polymers, the "base polymer" or "base polymer powder" means those made in powder form by drying and pulverizing the crosslinked polymer. Further, the "super absorbent polymer" means the polymer or the base polymer itself according to the context, or it is used to include those made to be appropriate for productization through additional processes, for example, surface crosslinking, particle reassembly, drying, pulverization, classification, etc. of the crosslinked polymer or the base polymer.

In order to improve the physical properties of the super absorbent polymer, an attempt is made to use nanoclay as an internal crosslinking agent.

Meanwhile, the nanoclay varies depending on the type, but the surface or edge often has a negative charge or a positive charge. Due to these charges, they tend to aggregate with each other.

Further, when nanoclay is added to the monomer composition for preparing a super absorbent polymer, the tendency of aggregation of nanoclay particles becomes stronger because of the high ion concentration of the alkali metal salt or basic compound charged for neutralization.

Further, the monomer composition has a value between pH 5 and pH 7, but it is known that, in the above pH range, nanoclay is unstable and thus aggregation is induced.

Because of the high ionic concentration and pH of the monomer composition, there is a problem that the nanoclay has poor dispersibility in the monomer composition. Therefore, a method of adding a nanoclay treated with a dispersant to improve the dispersibility or a method of using a nanoclay modified by introducing a functional group such as a (meth) acrylate functional group on the surface or edge of the nanoclay has been studied.

However, in the case of using the nanoclay treated with a dispersant, dispersibility is imparted, but since surplus dispersant floats and acts as an impurity, there is a problem that physical properties of the super absorbent polymer are deteriorated. Further, since the process of modification is required before using nanoclay, the process steps become complicated, and consequently, the production cost is increased and it is difficult to be practically applied to a mass production process.

Therefore, as a result of repeated research on methods capable of reducing the occurrence of impurities and increasing the process efficiency while increasing the dispersibility of nanoclay, the transparency and dispersibility can be maintained in the monomer composition without pretreatment such as modification by introducing a positively charged laponite in the monomer composition for preparing a super absorbent polymer in the form of a colloidal solution and polymerizing it, and therefore, the efficiency of the polymerization process is high since the polymerization of the monomer composition is not inhibited, and consequently contributes to the improvement of the physical properties of the super absorbent polymer. The present invention has been completed on the basis of these findings.

Further, the present inventors have found through experiments that when the polymerization is performed by introducing a laponite colloidal solution containing laponite so that the content of laponite is 0.02 to 0.09 parts by weight based on 100 parts by weight of the monomer composition, the laponite can act together with the internal crosslinking agent without impairing the polymerization process to form a double crosslinked structure in the crosslinked polymer, thereby achieving optimized crosslinking density, centrifuge retention capacity and absorption under pressure.

Further, in general, non-modified nanoclay has a weak interaction with the crosslinked polymer because nanoclay particles aggregate with each other, whereas the positively charged laponite introduced in the form of a colloidal solution can prevent these problems. In particular, it has been found that a positively charged laponite forms a network due to ionic bonding in aqueous solution, rather than neutral or negatively charged laponite, thereby achieving a better absorption under pressure.

Consequently, according to the preparation method of the present invention, it has been found that as the crosslinked polymer and the super absorbent polymer include a crosslinked structure derived from a positively charged laponite and an internal crosslinking agent, it is possible to provide a super absorbent polymer having excellent physical properties such as appropriate crosslinking density, centrifuge retention capacity and absorption under pressure.

In the method for preparing a super absorbent polymer according to one embodiment of the present invention, first, a monomer composition containing a water-soluble ethylenically unsaturated monomer, an internal crosslinking agent, and a polymerization initiator is prepared.

As the water-soluble ethylenically unsaturated monomers, monomers commonly used in the preparation of super absorbent polymer may be used without particular limitation. One or more selected from the group consisting of anionic monomers and salts thereof, non-ionic hydrophilic containing monomers, and amino group containing unsaturated monomers and quaternarized products thereof may be used.

Specifically, as the water-soluble ethylenically unsaturated monomers, one or more selected from the group consisting of anionic monomers and salts thereof such as (meth)acrylic acid, maleic anhydride, fumaric acid, crotonic acid, itaconic acid, 2-acryloylethane sulfonic acid, 2-methacryloylethane sulfonic acid, 2-(meth)acryloylpropane sulfonic acid or 2-(meth)acrylamide-2-methyl propane sulfonic acid; non-ionic hydrophilic group containing monomers such as (meth)acrylamide, N-substituted (meth)acrylate, 2-hydroxyethyl (meth)acrylate, 2-hydroxypropyl (meth)acrylate, methoxy polyethylene glycol (meth)acrylate, or polyethylene glycol (meth)acrylate; and amino group containing unsaturated monomers such as (N,N)-dimethylaminoethyl (meth)acrylate, (N,N)-dimethylaminopropyl (meth)acrylamide, and quaternarized products thereof, may be preferably used.

More preferably, acrylic acid or salts thereof, for example, acrylic acid and/or alkali metal salts such as a sodium salt thereof may be used, and by using such monomers, a super absorbent polymer having more excellent physical properties can be prepared. In case the alkali metal salt of acrylic acid is used as monomers, the acrylic acid may be used by neutralizing it with a basic compound such as caustic soda (NaOH).

The concentration of the acrylic acid-based monomer may be about 20% to about 60% by weight, preferably about 40% to about 50% by weight, based on the monomer composition including raw materials of the super absorbent polymer and a solvent, and it may be controlled to be an adequate concentration in consideration of the polymerization time and the reaction conditions. However, when the concentration of the monomer is excessively low, the yield of the super absorbent polymer is low and there may be a problem in economic efficiency. In contrast, when the concentration is excessively high, it may cause problems in processes that a part of the monomer may be precipitated or the pulverization efficiency of the prepared hydrogel polymer appears low in the pulverizing process, and thus the physical properties of the super absorbent polymer may be decreased.

Separately, a laponite colloidal solution containing a positively charged laponite in an amount of 0.02 to 0.09 part by weight based on 100 parts by weight of the monomer composition is prepared.

In the method for preparing a super absorbent polymer of the present invention, the laponite colloidal solution means an aqueous dispersion liquid in which a laponite, which is a kind of nanoclay, a positively charged laponite among them is uniformly dispersed in water.

As described above, the laponite colloidal solution has a higher degree of dispersion in the monomer composition than the laponite existing in the form of particle or powder, and thus does not inhibit the polymerization process of the monomer composition, and can achieve high process efficiency.

In addition, the laponite introduced in the form of powder is present in a form aggregated to a certain size or larger in the polymerization process of the super absorbent polymer, and functions as a passage for discharging a heat, and does not have a special interaction with the crosslinked polymer. However, the laponite colloidal solution according to the present invention reacts with the polymer in the state where fine laponite is dispersed in the polymerization process of the super absorbent polymer to form a crosslinked structure. This directly affects the physical properties of the polymer and thus can serve to improve gel strength and absorption characteristics.

Also, the laponite colloidal solution may be contained in the monomer composition so that the content of the positively charged laponite is about 0.02 parts by weight or about 0.04 parts by weight, and about 0.09 parts by weight or about 0.08 parts by weight or less based on the 100 parts by weight of the monomer composition.

When the content of laponite is lower than 0.02 part by weight based on the monomer composition, the degree of improvement in crosslinking density is low and the centrifuge retention capacity can be enhanced, but the gel strength is low. Conversely if the content of laponite exceeds 0.09 parts by weight based on the monomer composition, the crosslinking density is high and the gel strength is high, but the centrifuge retention capacity may be lowered. From this point of view, it is desirable that it is contained within the range of the above-mentioned parts by weight.

The charge amount of the laponite may be 1 to 10 mmol/100 g, or about 1 to 5 mmol/100 g. If the charge amount of the laponite is too low, laponite may exist in an aqueous solution state, and if the charge amount is too high, laponite aggregation (gelation) may occur even in a small amount. From this point of view, the charge amount of the positively charged laponite is preferably within the above-mentioned range. Further, examples of the positively charged laponite include Laponite XLG, Laponite RD, Laponite EP, Laponite XL21, Laponite D, or the like, but the present invention is not limited thereto. Preferably, Laponite XLG can be used.

The gel strength of the crosslinked polymer is an index for measuring the crosslinking density, and the higher the gel strength means that the crosslinked polymer has a dense crosslinking density, so that the physical properties of the absorption under pressure (AUP) can be improved. However, when the gel strength is too high, water absorption without pressure becomes difficult and the centrifuge retention capacity (CRC) may be lowered. In other words, the gel strength and the centrifuge retention capacity are in inverse proportion to the super absorbent polymer, and it is difficult to improve the gel strength and the centrifuge retention capacity at the same time.

However, according to the present invention, during the polymerization of the monomer composition, the polymerization is carried out by mixing the laponite colloidal solution containing a positively charged laponite in a predetermined part by weight range so that the gel strength and the centrifuge retention capacity can be increased together.

Further, the crosslinked polymer of the present invention has a characteristic that the gel strength and the centrifuge retention capacity satisfy the following Formula 1.

$$4.00 \leq GSI \text{ (Gel strength index)} \leq 4.20 \quad \text{[Formula 1]}$$

wherein, GSI=(gel strength of the crosslinked polymer (unit: Pa)+9,750*ln (centrifuge retention capacity (CRC, unit: g/g) measured according to EDANA method WSP 241.3)/10,000. Also, ln means a natural logarithm.

The gel strength means a horizontal gel strength of the crosslinked polymer measured after absorbing and swelling a physiological saline solution (0.9 wt % sodium chloride aqueous solution) to the crosslinked polymer for 1 hour, and it can be measured using a rheometer.

The GSI is an index capable of evaluating the relationship between the gel strength and the centrifuge retention capacity. According to the present invention, the gel strength and the centrifuge retention capacity of the crosslinked polymer are attained to an appropriate level. By satisfying the above-mentioned relational equation, it is possible to provide a super absorbent polymer having a balance of gel strength and the centrifuge retention capacity and having optimized physical properties.

Further, the crosslinked polymer has a centrifuge retention capacity (CRC), measured according to EDANA method WSP 241.3, of about 35 g/g or more, or about 38 g/g or more, or about 39 g/g or more, and about 50 g/g or less, or about 48 g/g or less, or about 45 g/g or less, which is within the range satisfying Formula 1 above, thus exhibiting excellent centrifuge retention capacity.

Further, according to an embodiment of the present invention, the crosslinked polymer has a gel strength of about 2,500 Pa or more, or about 2,800 Pa or more, or about 3,000 Pa or more, and about 5,000 Pa or less, or about 4,500 Pa or less, or about 4,400 Pa or less, which is within the range satisfying Formula 1 above, thus exhibiting a high gel strength.

Further, according to an embodiment of the present invention, the crosslinked polymer has an absorption under pressure (AUP), measured under 0.7 psi according to EDANA method WSP 242.3, of about 20 g/g or more, or about 21 g/g or more, or about 22 g/g or more, and about 30 g/g or less, or about 28 g/g or less, or about 26 g/g or less, thus exhibiting excellent absorption under pressure.

According to one embodiment of the present invention, the laponite colloidal solution may include laponite in the concentration of about 0.5% by weight or more, or about 1% by weight or more, or about 2% by weight or more, and about 10% by weight or less, or about 5% by weight or less, or about 4% by weight or less. If the concentration of laponite is too low, the amount of water becomes relatively large, so that the efficiency of the polymerization process may deteriorate, and if the concentration is too high, the dispersion degree of laponite is lowered, the viscosity is increased, and it may be difficult to use commercially. Therefore, it is preferable that the concentration is within the above-described range.

Further, according to one embodiment of the present invention, the viscosity of the laponite colloidal solution at 25° C. may be about 1.2 cps or more, or about 1.5 cps or more, or about 1.65 cps or more, and about 10 cps or less, or about 8 cps or less, or about 4 cps or less. If the viscosity of the laponite colloidal solution is too low, a relatively large amount of water is contained and thus the efficiency of the process can be reduced. If the viscosity is too high, the transfer is difficult and control of the process is also difficult. Therefore, it is preferable that the viscosity is within the above range.

According to one embodiment of the present invention, the average particle diameter of the laponite contained in the laponite colloidal solution is not particularly limited, and it may be about 10 nm or more, about 15 nm or more, or 20 nm or more, and about 100 nm or less, or about 80 nm or less, or about 50 nm or less.

In the preparation method of the super absorbent polymer according to the present invention, the polymerization initiator used during the polymerization is not particularly limited as long as it is generally used in the preparation of the super absorbent polymer.

Specifically, as the polymerization initiator, a thermal polymerization initiator or a photo-polymerization initiator by UV irradiation may be used depending on the polymerization method. However, even in the case of using the photo-polymerization method, because a certain amount of heat is generated by the ultraviolet irradiation or the like and a certain degree of heat is generated according to the progress of the exothermic polymerization reaction, a thermal polymerization initiator may be additionally included.

The photo-polymerization initiator can be used without particular limitation as long as it is a compound capable of forming a radical by a light such as an UV ray.

The photo-polymerization initiator, for example, may include one or more initiators selected from the group consisting of a benzoin ether, a dialkyl acetophenone, a hydroxyl alkylketone, a phenyl glyoxylate, a benzyl dimethyl ketal, an acyl phosphine, and an a-aminoketone. Meanwhile, specific examples of the acyl phosphine may include normal lucirin TPO, namely, 2,4,6-trimethyl-benzoyl-trimethyl phosphine oxide. More various photo-polymerization initiators are well disclosed in "UV Coatings: Basics, Recent Developments and New Application" written by Reinhold Schwalm, (Elsevier, 2007), p 115, however the photo-polymerization initiator is not limited to the above-described examples.

The photo-polymerization initiator may be included in the concentration of about 0.01% to about 1.0% by weight based on the monomer composition. When the concentration of the photo-polymerization initiator is excessively low, the polymerization rate may become slow, and when the concentration of the photo-polymerization initiator is excessively high, the molecular weight of the super absorbent polymer becomes small and its physical properties may become uneven.

And, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4$)$_2S_2O_8$), and the like; and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, 4,4-azobis-(4-cyanovaleric acid) and the like. More various thermal polymerization initiators are well disclosed in "Principle of Polymerization" written by Odian, (Wiley, 1981), p 203, however the thermal polymerization initiator is not limited to the above-described examples.

The thermal polymerization initiator may be included in the concentration of about 0.001% to about 0.5% by weight based on the monomer composition. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

The monomer composition may further include an internal crosslinking agent as the raw material of the super absorbent polymer. The internal crosslinking agent may include a crosslinking agent having one or more ethylenically unsaturated groups while having one or more functional groups capable of reacting with water-soluble substituents of the ethylenically unsaturated monomer; or a crosslinking agent having two or more functional groups capable of reacting with the water-soluble substituents of the monomer and/or the water-soluble substituents formed by hydrolysis of the monomer.

Specific examples of the internal crosslinking agent includes a bisacrylamide having 8 to 12 carbon atoms, a bismethacrylamide, a polyol polymetacrylate having 2 to 10 carbon atoms and a polyol poly(meth)ally ether having 2 to 10 carbon atoms. More specifically, one or more selected from the group consisting of N,N'-methylenebis(meth)acrylate, ethyleneoxy(meth)acrylate, polyethyleneoxy(meth) acrylate, propyleneoxy(meth)acrylate, glycerin diacrylate, glycerin triacrylate, trimethylol triacrylate, triallylamine, triaryloyanurate, triallylisocyanate, polyethyleneglycol, diethyleneglycol and propyleneglycol may be used.

Preferably, polyethylene glycol diacrylate (PEGDA) may be used as the internal crosslinking agent.

Such internal crosslinking agent may be included in an amount of about 0.01 part by weight or more, or about 0.1 part by weight or more, or about 0.2 part by weight or more, and about 0.5 part by weight or less, or about 0.4 part by weight or less, or about 0.35 part by weight or less, based on 100 parts by weight of the water-soluble ethylenically unsaturated monomer, and thus can crosslink the polymerized polymer.

In the preparation method of the present invention, the monomer composition of the super absorbent polymer may further include additives such as a thickener, a plasticizer, a preservation stabilizer, an antioxidant, and so on, as needed.

The raw materials such the water-soluble ethylenically unsaturated monomer, the photo-polymerization initiator, the thermal polymerization initiator, the internal crosslinking agent, and the additives may be prepared in the form of the monomer composition solution which is dissolved in a solvent.

In this case, the solvent can be used without any limitation as long as it can dissolve the above-described components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer composition.

Next, the monomer composition thus prepared and the laponite colloidal solution are uniformly mixed, and the mixture of the monomer composition and the laponite colloidal solution is subjected to thermal polymerization or photo-polymerization. The order and method of mixing the monomer composition and the laponite colloidal solution are not particularly limited.

Meanwhile, the method for forming a crosslinked polymer by the thermal polymerization or photo-polymerization of the monomer composition is not particularly limited as long as it is a polymerization method commonly used in the art.

Specifically, the polymerization method is largely classified into a thermal polymerization and a photo-polymerization depending on the polymerization energy source. The thermal polymerization may be typically carried out in a reactor like a kneader equipped with agitating spindles, and the photo-polymerization may be carried out in a reactor equipped with a movable conveyor belt. However, the above-described polymerization method is an example only, and the present invention is not limited thereto.

As one example, as described above, the thermal polymerization is carried out by supplying hot air to a reactor like a kneader equipped with the agitating spindles or by heating the reactor, thereby obtaining a hydrogel polymer. The resulting hydrogel polymer may have a size of centimeters or millimeters when it is discharged from the outlet of the reactor, depending on the type of the agitating spindles equipped in the reactor. Specifically, the size of the hydrogel polymer may vary depending on the concentration of the monomer composition injected thereto, the injection rate or the like, and the hydrogel polymer having a weight average particle diameter of 2 mm to 50 mm can be generally obtained.

Furthermore, when the photo-polymerization is carried out in a reactor equipped with a movable conveyor belt as described above, the form of the hydrogel polymer obtained may be usually a sheet-like hydrogel polymer having a width of the belt. In this case, the thickness of the polymer sheet may vary depending on the concentration of the monomer composition injected thereto and the injection rate. However, typically it is preferable to supply the monomer composition so that the sheet-like polymer having a thickness of about 0.5 cm to about 5 cm can be obtained. When the monomer composition is supplied so that the thickness of the sheet-like polymer becomes too thin, it is not preferred because the production efficiency is low. When the thickness of the sheet-like polymer exceeds 5 cm, the polymerization reaction may not uniformly occur throughout the whole thickness due to its excessively thick thickness.

The crosslinked polymer obtained by such method may have typically a moisture content of about 40% to about 80% by weight. Meanwhile, the term "moisture content" as used herein refers to the content of moisture in the total weight of the crosslinked polymer, which is obtained by subtracting the weight of the dried polymer from the weight of the crosslinked polymer. Specifically, it is defined as a value calculated by measuring the weight loss according to evaporation of water in the crosslinked polymer during the drying process of increasing the temperature of the crosslinked polymer through infrared heating. In this case, the moisture content is measured under the drying conditions where the temperature is increased from room temperature to 180° C. and then the temperature is maintained at 180° C., and the total drying time is set to 20 minutes, including 5 minutes for the temperature rising step.

Subsequently, the hydrogel crosslinked polymer is coarsely pulverized.

A pulverizing machine used herein may include, but its configuration is not limited to, for example, any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarsely pulverizing step may be carried out so that the particle diameter of the hydrogel crosslinked polymer becomes about 2 mm to about 20 mm.

Coarsely pulverizing the hydrogel crosslinked polymer into a particle diameter of less than 2 mm is technically not easy due to its high moisture content, and agglomeration may occur between the pulverized particles. Meanwhile, if the polymer is coarsely pulverized into a particle diameter of greater than 20 mm, the effect of increasing the efficiency in the subsequent drying step may be insignificant.

Next, the hydrogel crosslinked polymer thus obtained is dried.

The hydrogel crosslinked polymer coarsely pulverized as described above or the hydrogel polymer immediately after polymerization without the coarsely pulverizing step is subjected to a drying step. In this case, the drying temperature of the drying step may be about 150° C. to about 250° C. When the drying temperature is less than 150° C., it is likely that the drying time becomes too long or the physical properties of the super absorbent polymer finally formed is deteriorated, and when the drying temperature is higher than 250° C., only the surface of the polymer is dried, and thus it is likely that fine powder is generated during the subsequent pulverizing step and the physical properties of the super absorbent polymer finally formed is deteriorated. Therefore, the drying step may be preferably carried out at a temperature of about 150° C. to about 200° C., and more preferably at a temperature of about 160° C. to about 180° C.

Meanwhile, the drying time may be about 20 to about 90 minutes, in consideration of the process efficiency, but it is not limited thereto.

In the drying step, the drying method may also be selected and used without any limitation if it is a method generally used for drying the hydrogel crosslinked polymer. Specifically, the drying step may be carried out by a method such as hot air supply, infrared irradiation, microwave irradiation or ultraviolet irradiation. When the drying step as above is finished, the moisture content of the polymer may be about 0.1% to about 10% by weight.

Next, the dried crosslinked polymer obtained through the drying step is pulverized.

The polymer powder obtained through the pulverizing step may have a particle diameter of about 150 μm to about 850 μm. Specific examples of a pulverizing device that can be used to achieve the above particle diameter may include a pin mill, a hammer mill, a screw mill, a roll mill, a disc mill, a jog mill or the like, but the present invention is not limited to the above-described examples.

Also, in order to control the physical properties of the super absorbent polymer finally commercialized, a step of selectively classifying particles having a particle diameter of 150 μm to 850 μm in the polymer powder obtained after the pulverizing step may be further performed.

The step of subjecting the polymer pulverized through the above-mentioned step to a surface crosslinking reaction with a surface crosslinking agent can be further performed.

The surface modification is a step of inducing a crosslinking reaction on the surface of the pulverized polymer in the presence of a surface crosslinking agent to form a super absorbent polymer having more improved physical properties. Through such surface modification, a surface crosslinking layer is formed on the surface of the pulverized polymer particles.

The surface crosslinking reaction can be carried out by a conventional method of increasing the crosslinking density of the surface of the polymer particle. For example, it can be carried out by a method of mixing a solution containing a surface crosslinking agent and the pulverized polymer and causing a crosslinking reaction.

Preferably, in order to improve the properties of the produced super absorbent polymer, one or more selected from the group consisting of a polyhydric alcohol compound; an epoxy compound; a polyamine compound; a haloepoxy compound; a condensation product of the haloepoxy compound; an oxazoline compound; a mono-, di- or poly-oxazolidinone compound; a cyclic urea compound; a polyvalent metal salt; and an alkylene carbonate compound may be used as the surface crosslinking agent.

Specific examples of the polyhydric alcohol compound may include one or more selected from the group consisting of a mono-, di-, tri-, tetra- or polyethylene glycol, monopropylene glycol, 1,3-propanediol, dipropylene glycol, 2,3,4'-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may include ethylene glycol diglycidyl ether, glycidol and the like. The polyamine compound may include one or more selected from the group consisting of ethylene diamine, diethylene triamine, triethylene tetraamine, tetraethylene pentamine, pentaethylene hexamine, polyethylene imine, and polyamide polyamine.

Further, the haloepoxy compound may include epichlorohydrin, epibromohydrin, or a-methylephichlorohydrin. Meanwhile, the mono-, di-, or polyoxazolidinone compound may include, for example, 2-oxazolidinone and the like.

Further, the alkylene carbonate compound may include ethylene carbonate and the like. These may be used alone or in combination with each other. On the other hand, to increase the efficiency of the surface crosslinking process, among these surface crosslinking agents, one or more of polyhydric alcohols may be preferably used, and more preferably, one or more of polyhydric alcohols having 2 to 10 carbon atoms may be used.

Preferably, ethylene carbonate is used as the surface crosslinking agent.

The amount of the surface crosslinking agent added may be suitably selected depending on the kind of the surface crosslinking agent added or the reaction conditions. However, the surface crosslinking agent may be typically used in an amount of about 0.001 to about 5 parts by weight, preferably about 0.01 to about 3 parts by weight, and more preferably about 0.05 to about 2 parts by weight, based on 100 parts by weight of the polymer.

When the amount of the surface crosslinking agent used is excessively small, the surface crosslinking reaction hardly occurs, and when the amount is higher than 5 parts by weight based on 100 parts by weight of the polymer, the absorption capacity and the physical properties may be decreased due to excessive surface crosslinking reaction.

The method for adding the surface crosslinking agent to the polymer is not limited in its constitution. A method of adding the surface crosslinking agent and the polymer powder to a reaction vessel and then mixing them, or a method of spraying the surface crosslinking agent on the polymer powder, a method of continuously supplying the polymer and the surface crosslinking agent in a mixer continuously operated and mixing them, and the like can be used.

When the surface crosslinking agent is added, it may be added by further mixing together with water. When water is added, there is an advantage that the surface crosslinking agent can be uniformly dispersed in the polymer. Herein, water is preferably added at a ratio of about 1 to about 10 parts by weight based on 100 parts by weight of the polymer, for the purpose of inducing a uniform distribution of the surface crosslinking agent and preventing an aggregation phenomenon of the polymer powder, while optimizing the depth of the penetration from the surface of the crosslinking agent.

The polymer particles to which the surface crosslinking agent is added, are heated at a temperature of about 140 to about 220° C., preferably about 160 to about 200° C. for about 15 to about 90 minutes, preferably about 20 to about 80 minutes, and thereby the surface crosslinking reaction and the drying can be carried out at the same time. When the crosslinking reaction temperature is less than 140° C., the surface cross-linking reaction and the reaction of aluminosilicate may not occur, and when it is greater than 220° C., due to carbonization, foreign substance and odor may be generated, or due to excessive reaction, the physical properties may be deteriorated and stable operation conditions may not be secured. And, if the crosslinking reaction time is too short, less than 15 minutes, sufficient crosslinking reaction may not be carried out, and if the crosslinking reaction time is greater than 90 minutes, due to excessive surface crosslinking, polymer particles may be damaged and the physical properties may be deteriorated.

The temperature raising means for the surface crosslinking reaction is not particularly limited. The heating can be carried out by providing a heating medium or directly providing a heating source. The type of heat medium that can be used here includes a heated fluid such as steam, hot air, hot oil, etc., but the present invention is not limited thereto. Further, the temperature of the heating medium to be provided can be appropriately selected in consideration of the means of the heating medium, the temperature raising speed, and the temperature raising target temperature. Meanwhile, a heat source to be provided directly may include a heating method using electricity or a heating method using gas, but the present invention is not limited to the above-described examples.

The super absorbent polymer obtained according to the preparation method of the present invention as described above has improved centrifuge retention capacity, absorption under pressure and gel strength.

In addition, not only the base polymer which is obtained by polymerizing a mixture of the monomer composition and the laponite colloidal solution and which is a crosslinked polymer before the surface crosslinking step, but also an super absorbent polymer containing a surface crosslinked layer on the surface of the crosslinked polymer via surface crosslinking or the like have a gel strength and a centrifuge retention capacity which satisfy the relation of the following Formula 1.

$$4.00 \leq GSI(\text{Gel strength index}) \leq 4.20 \qquad \text{[Formula 1]}$$

wherein, GSI=(gel strength of the super absorbent polymer (unit: Pa)+9,750*ln (centrifuge retention capacity (CRC, unit: g/g) measured according to EDANA method WSP 241.3)/10,000.

Further, the super absorbent polymer has a centrifuge retention capacity (CRC), measured according to EDANA method WSP 241.3, of about 33 g/g or more, or about 34 g/g or more, or about 35 g/g or more, and about 45 g/g or less, or about 43 g/g or less, or about 42 g/g or less, which is within the range satisfying Formula 1 above, thus exhibiting excellent centrifuge retention capacity.

Further, according to an embodiment of the present invention, the super absorbent polymer has a gel strength of about 3,500 Pa or more, or about 4,000 Pa or more, or about 4,100 Pa or more, and about 6,500 Pa or less, or about 6,000 Pa or less, or about 5,900 Pa or less, which is within the range satisfying Formula 1 above, thus exhibiting a high gel strength.

Further, according to an embodiment of the present invention, the super absorbent polymer has an absorption under pressure (AUP), measured under 0.7 psi according to EDANA method WSP 242.3, of about 20 g/g or more, or about 21 g/g or more, or about 22 g/g or more, and about 30 g/g or less, or about 28 g/g or less, or about 26 g/g or less, thus exhibiting excellent absorption under pressure.

The super absorbent polymer according to another embodiment of the present invention includes a crosslinked polymer formed by polymerizing a mixture of a monomer composition containing a water soluble ethylenically unsaturated monomer, an internal crosslinking agent, and a polymerization initiator; and a laponite colloidal solution containing 0.02 to 0.09 part by weight of a positively charged laponite based on 100 parts by weight of the monomer composition.

The super absorbent polymer according to one embodiment of the present invention includes a crosslinked polymer formed by a crosslinking polymerization of a water soluble ethylenically unsaturated monomer as a base polymer (resin).

In the super absorbent polymer of one embodiment of the invention, the crosslinked polymer, that is, the base polymer, is a polymer formed by polymerizing and crosslinking a mixture of a monomer composition containing a water soluble ethylenically unsaturated monomer, an internal crosslinking agent, and a polymerization initiator, and a laponite colloidal solution containing 0.02 to 0.09 part by weight of a positively charged laponite based on 100 parts by weight of the monomer composition. Specific explanation of the material and the preparation method used therefor are the same as those exemplified above in the method for preparing a super absorbent polymer. The water-soluble ethylenically unsaturated monomer may have at least partially neutralized acidic group.

As described in the preparation method of the super absorbent polymer, the super absorbent polymer can maintain the transparency and dispersibility in the monomer composition without pretreatment such as modification by introducing a positively charged laponite in the monomer composition for preparing a super absorbent polymer in the form of a colloidal solution and polymerizing it, and therefore, consequently contributes to the improvement of the physical properties of the super absorbent polymer.

Further, as the polymerization is performed by introducing a laponite colloidal solution containing laponite so that the content of laponite is 0.02 to 0.09 parts by weight based on 100 parts by weight of the monomer composition, the laponite can act together with the internal crosslinking agent without impairing the polymerization process to form a double crosslinked structure in the crosslinked polymer, thereby achieving optimized crosslink density and centrifuge retention capacity.

The crosslinked polymer include a crosslinked structure derived from the positively charged laponite and an internal crosslinking agent, and thus it is possible to provide a super absorbent polymer having excellent physical properties such as appropriate crosslinking density, centrifuge retention capacity and absorption under pressure.

In the super absorbent polymer of one embodiment of the present invention, the crosslinked polymer can satisfy the following Formula 1:

$$4.00 \leq GSI \text{ (Gel strength index)} \leq 4.20 \quad \text{[Formula 1]}$$

wherein, GSI=(gel strength of the crosslinked polymer (unit: Pa)+9,750*ln (centrifuge retention capacity (CRC, unit: g/g) measured according to EDANA method WSP 241.3)/10,000.

The crosslinked polymer of the present invention and the super absorbent polymer further including a surface crosslinked layer formed on the surface of the crosslinked polymer satisfies the above-mentioned Formula 1, and at the same time has improved centrifuge retention capacity, absorption under pressure and gel strength.

For example, the crosslinked polymer has a centrifuge retention capacity (CRC), measured according to EDANA method WSP 241.3, of about 35 g/g or more, or about 38 g/g or more, or about 39 g/g or more, and about 50 g/g or less, or about 48 g/g or less, or about 45 g/g or less, which is within the range satisfying Formula 1 above, thus exhibiting excellent centrifuge retention capacity.

Further, the crosslinked polymer has a gel strength of about 2,500 Pa or more, or about 2,800 Pa or more, or about 3,000 Pa or more, and about 5,000 Pa or less, or about 4,500 Pa or less, or about 4,400 Pa or less, which is within the range satisfying Formula 1 above, thus exhibiting a high gel strength.

Further, the crosslinked polymer has an absorption under pressure (AUP), measured under 0.7 psi according to EDANA method WSP 242.3, of about 20 g/g or more, or about 21 g/g or more, or about 22 g/g or more, and about 30 g/g or less, or about 28 g/g or less, or about 26 g/g or less, thus exhibiting excellent absorption under pressure.

Further, the super absorbent polymer further including a surface crosslinked layer formed on the surface of the crosslinked polymer has a centrifuge retention capacity (CRC), measured according to EDANA method WSP 241.3, of about 33 g/g or more, or about 34 g/g or more, or about 35 g/g or more, and about 45 g/g or less, or about 43 g/g or less, or about 42 g/g or less, which is within the range satisfying Formula 1 above, thus exhibiting excellent centrifuge retention capacity.

Further, the super absorbent polymer has a gel strength of about 3,500 Pa or more, or about 4,000 Pa or more, or about 4,100 Pa or more, and about 6,500 Pa or less, or about 6,000 Pa or less, or about 5,900 Pa or less, which is within the range satisfying Formula 1 above, thus exhibiting a high gel strength.

Further, according to one embodiment of the present invention, the super absorbent polymer has an absorption under pressure (AUP), measured under 0.7 psi according to EDANA method WSP 242.3, of about 20 g/g or more, or about 21 g/g or more, or about 22 g/g or more, and about 30 g/g or less, or about 28 g/g or less, or about 26 g/g or less, thus exhibiting excellent absorption under pressure.

The present invention will be described in more detail with reference to the following Examples. However, the following Examples are for illustrative purposes only, and the present invention is not intended to be limited by these Examples.

EXAMPLE

Example 1

100 g of acrylic acid, 0.34 g of polyethylene glycol diacrylate (Mw=523) as an internal crosslinking agent, 0.008 g of diphenyl 2,4,6-trimethylbenzoyloxide as a UV initiator, 121.5 g of 32% caustic soda, 0.2 g of sodium persulfate and 36.6 g of water were mixed to prepare a monomer composition having an acrylic acid monomer concentration of 46% by weight.

Laponite colloidal solution with a concentration of 2 wt % (viscosity of 3.68 cps at 25° C.) in which laponite (Laponite XLG, positive charge: 4-5 mmol/100 g, average particle diameter: 30 nm) was dispersed in water was separately prepared. The laponite colloidal solution was mixed with the monomer composition such that 0.04 part by weight of laponite was contained relative to 100 parts by weight of the monomer composition.

The mixture was fed onto a rotary belt having a width of 10 cm and a length of 2 m and rotating at a speed of 50 cm/min in a feed rate of 500 ml/min to 2000 ml/min.

Simultaneously with the feeding of the mixture, ultraviolet rays having an intensity of 10 mW/cm$^2$ were irradiated to perform the polymerization reaction for 60 seconds.

After completion of the polymerization reaction, it was cut with a meat chopper method and dried at 185° C. for 40 minutes using an air-flow oven to obtain a crosslinked polymer as a base resin.

Example 2

A crosslinked polymer was prepared in the same manner in Example 1, except that 0.31 g of polyethylene glycol diacrylate (Mw=523) was used as an internal crosslinking agent in Example 1.

Example 3

A crosslinked polymer was prepared in the same manner in Example 1, except that the laponite colloidal solution was mixed with the monomer composition such that 0.08 part by weight of laponite was contained relative to 100 parts by weight of the monomer composition in Example 1.

Example 4

A crosslinked polymer was prepared in the same manner in Example 1, except that laponite colloidal solution with a concentration of 1 wt (viscosity of 1.65 cps at 25° C.) in which laponite (Laponite XLG, positive charge: 4-5 mmol/100 g, average particle diameter: 30 nm) was dispersed in water was separately prepared, and the laponite colloidal solution was mixed with the monomer composition such that 0.04 part by weight of laponite was contained relative to 100 parts by weight of the monomer composition.

Example 5

A crosslinked polymer was prepared in the same manner in Example 1 except that 0.1 g of polyethylene glycol diacrylate (Mw=523) was used as an internal crosslinking agent in Example 1.

Comparative Example 1

100 g of acrylic acid, 0.28 g of polyethylene glycol diacrylate (Mw=523) as an internal crosslinking agent, 0.008 g of diphenyl 2,4,6-trimethylbenzoyloxide as a UV initiator, 121.5 g of 32% caustic soda, 0.2 g of sodium persulfate and 36.6 g of water were mixed to prepare a monomer composition having an acrylic acid monomer concentration of 46% by weight.

The monomer composition was fed onto a rotary belt having a width of 10 cm and a length of 2 m and rotating at a speed of 50 cm/min in a feed rate of 500 ml/min to 2000 ml/min. Simultaneously with the feeding of the mixture, ultraviolet rays having an intensity of 10 mW/cm$^2$ were irradiated to perform the polymerization reaction for 60 seconds, thereby preparing a crosslinked polymer.

After completion of the polymerization reaction, it was cut with a meat chopper method and dried at 185° C. for 40 minutes using an air-flow oven.

Comparative Example 2

A crosslinked polymer was prepared in the same manner in Comparative Example 1, except that 0.31 g of polyethylene glycol diacrylate (Mw=523) was used as an internal crosslinking agent in Comparative Example 1.

Comparative Example 3

A crosslinked polymer was prepared in the same manner in Example 1, except that the laponite colloidal solution (viscosity of 1.15 cps at 25° C.) was mixed with the monomer composition such that 0.01 part by weight of laponite was contained relative to 100 parts by weight of the monomer composition.

Comparative Example 4

A crosslinked polymer was prepared in the same manner in Example 1, except that the laponite colloidal solution (viscosity of 3.68 cps at 25° C.) was mixed with the monomer composition such that 0.15 part by weight of laponite was contained relative to 100 parts by weight of the monomer composition.

Comparative Example 5

100 g of acrylic acid, 0.34 g of polyethylene glycol diacrylate (Mw=523) as an internal crosslinking agent, 0.008 g of diphenyl 2,4,6-trimethylbenzoyloxide as a UV initiator, 121.5 g of 32% caustic soda, 0.2 g of sodium persulfate and 36.6 g of water were mixed to prepare a monomer composition having an acrylic acid monomer concentration of 46% by weight.

0.04 part by weight of laponite (average particle diameter: 30 nm) relative to 100 parts by weight of the monomer composition was added to the monomer composition in powder form.

The above monomer composition was subjected to polymerization reaction in the same polymerization process as in Example 1 to prepare a crosslinked polymer.

Comparative Example 6

100 g of acrylic acid, 0.34 g of polyethylene glycol diacrylate (Mw=523) as an internal crosslinking agent, 0.008 g of diphenyl 2,4,6-trimethylbenzoyloxide as a UV initiator, 121.5 g of 32% caustic soda, 0.2 g of sodium persulfate and 36.6 g of water were mixed to prepare a monomer composition having an acrylic acid monomer concentration of 46% by weight.

0.08 part by weight of laponite (average particle diameter: 30 nm) relative to 100 parts by weight of the monomer composition was added to the monomer composition in powder form.

The above monomer composition was subjected to polymerization reaction in the same polymerization process as in Example 1 to prepare a crosslinked polymer.

Comparative Example 7

100 g of acrylic acid, 0.1 g of polyethylene glycol diacrylate (Mw=523) as an internal crosslinking agent, 0.008 g of diphenyl 2,4,6-trimethylbenzoyloxide as a UV initiator, 121.5 g of 32% caustic soda, 0.2 g of sodium persulfate and 36.6 g of water were mixed to prepare a monomer composition having an acrylic acid monomer concentration of 46% by weight.

0.39 part by weight of laponite (average particle diameter: 30 nm) relative to 100 parts by weight of the monomer composition was added to the monomer composition in powder form.

The above monomer composition was subjected to polymerization reaction in the same polymerization process as in Example 1 to prepare a crosslinked polymer.

Comparative Example 8

Laponite colloidal solution with a concentration of 2 wt % (viscosity of 3.68 cps at 25° C.) in which Laponite XLS (Negative charge: 50-55 mmol/100 g, average particle diameter: 30 nm) instead of Laponite XLG in Example 1 was dispersed in water was prepared, and the laponite colloidal solution was mixed with the monomer composition such that 0.02 part by weight of laponite was contained relative to 100 parts by weight of the monomer composition.

The remaining process and components were used in the same manner as in Example 1 to prepare a crosslinked polymer.

Comparative Example 9

Laponite colloidal solution with a concentration of 2 wt % (viscosity of 3.68 cps at 25° C.) in which Laponite XLS (negative charge: 50-55 mmol/100 g, average particle diameter: 30 nm) instead of Laponite XLG in Example 1 was dispersed in water was prepared, and the laponite colloidal solution was mixed with the monomer composition such that 0.04 part by weight of laponite was contained relative to 100 parts by weight of the monomer composition.

The remaining process and components were used in the same manner as in Example 1 to prepare a crosslinked polymer.

Comparative Example 10

Laponite colloidal solution with a concentration of 2 wt % (viscosity of 3.68 cps at 25° C.) in which Laponite XLS (negative charge: 50-55 mmol/100 g, average particle diameter: 30 nm) instead of Laponite XLG in Example 1 was dispersed in water was prepared, and the laponite colloidal solution was mixed with the monomer composition such that 0.08 part by weight of laponite was contained relative to 100 parts by weight of the monomer composition.

The remaining process and components were used in the same manner as in Example 1 to prepare a crosslinked polymer.

The main process conditions of Examples and Comparative Examples are shown in Table 1 below.

TABLE 1

| | Form of feeding and type of Laponite | Content of laponite (unit: part by weight relative to monomer composition) | Content of internal crosslinking agent (unit: part by weight relative to acrylic acid) |
|---|---|---|---|
| Example 1 | Colloidal solution, Laponite XLG | 0.04 | 0.34 |
| Example 2 | Colloidal solution, Laponite XLG | 0.04 | 0.31 |
| Example 3 | Colloidal solution, Laponite XLG | 0.08 | 0.31 |
| Example 4 | Colloidal solution, Laponite XLG | 0.04 | 0.34 |
| Example 5 | Colloidal solution, Laponite XLG | 0.04 | 0.1 |
| Comparative Example 1 | — | — | 0.28 |
| Comparative Example 2 | — | — | 0.31 |
| Comparative Example 3 | Colloidal solution, Laponite XLG | 0.01 | 0.34 |
| Comparative Example 4 | Colloidal solution, Laponite XLG | 0.15 | 0.34 |
| Comparative Example 5 | Powder, Laponite XLG | 0.04 | 0.34 |
| Comparative Example 6 | Powder, Laponite XLG | 0.08 | 0.34 |
| Comparative Example 7 | Powder, Laponite XLG | 0.39 | 0.1 |
| Comparative Example 8 | Colloidal solution, Laponite XLS | 0.02 | 0.34 |
| Comparative Example 9 | Colloidal solution, Laponite XLS | 0.04 | 0.34 |
| Comparative Example 10 | Colloidal solution, Laponite XLS | 0.08 | 0.34 |

Preparation of Super Absorbent Polymer

Example 6

A mixed solution of 3.2 g of ultrapure water, 4 g of methanol, 0.154 g of ethylene carbonate, and 0.01 g of DM30S was added to 100 g of the base polymer (crosslinked polymer) of Example 1 and mixed for 1 minute. The mixture was subjected to a surface crosslinking reaction at 185° C. for 90 minutes and classified to obtain a super absorbent polymer in the form of a particle with a size of 150 to 850 μm.

Examples 7 to 10

Surface crosslinking reaction was performed respectively for the base polymers of Examples 2 to 5 in the same manner as in Example 6 to obtain a super absorbent polymer.

Comparative Examples 11 to 20

Surface crosslinking reaction was performed respectively for the base polymers of Comparative Examples 1 to 10 in the same manner as in Example 6 to obtain a super absorbent polymer.

EXPERIMENTAL EXAMPLE

The centrifuge retention capacity and gel strength of the base polymer or the super absorbent polymers prepared in Examples 1 to 10 and Comparative Examples 11 to 20 were evaluated by the following methods.

(1) Measurement of Centrifuge Retention Capacity (CRC)

The centrifuge retention capacity was measured in accordance with EDANA (European Disposables and Nonwovens Association) recommended test method No. WSP 241.3.

More specifically, the centrifuge retention capacity can be calculated according to the following Calculation Formula 1, after absorbing the super absorbent polymer in a physiological saline solution over 30 minutes:

$$CRC\ (g/g)=\{[W2(g)-W1(g)]/W0(g)\}-1 \quad \text{[Calculation Formula 1]}$$

in Calculation Formula 1,

W0(g) is the initial weight of super absorbent polymer(g), W1(g) is a weight (g) of the device, which is measured after performing dehydration by using a centrifuge without the super absorbent polymer at 250 G for 3 minutes, and W2(g) is a weight of the device including the super absorbent polymer, which is measured after immersing and absorbing the super absorbent polymer in 0.9 wt % physiological saline solution at room temperature for 30 minutes and then performing dehydration by using a centrifuge at 250 G for 3 minutes.

(2) Measurement of Gel Strength

The absorbent polymer sample (30~50 mesh) was sieved off and 1 of the sample was weighed. The weighed sample was sufficiently impregnated and swelled in 100 g of a physiological saline solution for 1 hour. After that, the solvent not absorbed therein was removed by using an aspirator for 4 minutes, and the solvent left on the surface of the same was evenly distributed and wiped once with a filter paper.

2.5 g of the swelled super absorbent polymer sample was placed between two plates (plates with a 25 mm diameter, a lower plate thereof having a wall with a 2 mm height for preventing the sample from leaking) of the rheometer, and the gap between the parallel plates was adjusted to 1 mm. (At this time, when the sample was hard and its adjustment at intervals of 1 mm was difficult, the gap between the parallel plates was properly adjusted by pressing the plates with a force of about 3 N so that the swelled super absorbent polymer sample was contacted evenly at the face of the plates).

Subsequently, the super absorbent polymer sample between the plates was stabilized for about 5 minutes.

Next, the stain of a linear viscoelastic regime section where the storage modulus (G') and the loss modulus (G") were steady was found by using the rheometer while increasing the shear strain at a 10 rad/s frequency. Generally, in the case of a swelled super absorbent polymer, a strain of 0.1% was imparted within the liner viscoelastic regime section. The viscoelasticity (G', G") of the swollen polymer was measured by using the strain value of the linear regime section at a constant frequency of 10 rad/s for 60 seconds. At this time, the value of G' obtained was averaged to determine the gel strength.

(3) GSI (gel strength index)

Using the centrifuge retention capacity and the gel strength obtained from the above (1) and (2), the GSI (gel strength index) was determined according to the following Formula:

$$GSI=(gel\ strength+9{,}750*\ln(centrifuge\ retention\ capacity))/10{,}000$$

(4) Absorption Under Pressure (AUP)

The absorption under pressure was measured in accordance with EDANA recommended test method No. WSP 242.3.

More specifically, the absorption under pressure can be calculated according to the following Calculation Formula 2, after absorbing the super absorbent polymer in a physiological saline solution under a load of about 0.7 psi over 1 hour:

$$AUP(g/g)=[W4(g)-W3(g)]/W0(g) \quad \text{[Calculation Formula 2]}$$

in Calculation Formula 2,

W0(g) is a weight(g) of the super absorbent polymer, W3(g) is the total sum (g) of a weight of the super absorbent polymer and a weight of the device capable of providing a load to the super absorbent polymer, and W4(g) is the total sum of a weight of the super absorbent polymer and a weight of the device capable of providing a load to the super absorbent polymer, after absorbing a physiological saline solution to the super absorbent polymer under a load (0.7 psi) for 1 hour.

The centrifuge retention capacity, gel strength and GSI of Examples and Comparative Examples measured according the above-mentioned measurement method are shown in Tables 2 and 3 below.

Further, a graph showing the relationship between the centrifuge retention capacity and gel strength of the cross-linked polymer (base resin) of Examples 1 to 5 and Comparative Examples 1 to 10 is shown in FIG. 1, and a graph showing the relationship between the centrifuge retention capacity and gel strength of the super absorbent polymer of Examples 6 to 10 and Comparative Examples 11 to 20 is shown in FIG. 2.

TABLE 2

| | Centrifuge retention capacity (g/g) | Absorption under pressure (g/g) | Gel strength (Pa) | GSI |
|---|---|---|---|---|
| Example 1 | 39.8 | 7.8 | 4315 | 4.023270239 |
| Example 2 | 43.7 | 7.2 | 3328 | 4.0157144 |
| Example 3 | 42.5 | 7.3 | 3637 | 4.019466474 |
| Example 4 | 40.8 | 8.0 | 4125 | 4.028465029 |
| Example 5 | 47.8 | 7.7 | 2834 | 4.053749999 |
| Comparative Example 1 | 45 | 7.1 | 2784 | 3.989895928 |
| Comparative Example 2 | 42.8 | 6.9 | 3171 | 3.97972465 |
| Comparative Example 3 | 45.4 | 6.8 | 2705 | 3.990624302 |
| Comparative Example 4 | 38.7 | 6.7 | 4107 | 3.97514361 |
| Comparative Example 5 | 40.0 | 7.0 | 3764 | 3.973057468 |
| Comparative Example 6 | 39.7 | 7.0 | 3789 | 3.968217408 |
| Comparative Example 7 | 45.8 | 6.9 | 2679 | 3.996576989 |
| Comparative Example 8 | 44.5 | 7.2 | 2897 | 3.990301959 |
| Comparative Example 9 | 43.6 | 7.1 | 3135 | 3.994180722 |
| Comparative Example 10 | 43.0 | 7.0 | 3235 | 3.990670113 |

TABLE 3

| | Centrifuge retention capacity (g/g) | Absorption under pressure (g/g) | Gel strength (Pa) | GSI |
|---|---|---|---|---|
| Example 6 | 34 | 27.5 | 5878 | 4.026001512 |
| Example 7 | 37.2 | 27.3 | 4931 | 4.019001042 |
| Example 8 | 36.4 | 26.7 | 5325 | 4.037204555 |
| Example 9 | 34.7 | 28.0 | 5612 | 4.019271195 |

TABLE 3-continued

| | Centrifuge retention capacity (g/g) | Absorption under pressure (g/g) | Gel strength (Pa) | GSI |
|---|---|---|---|---|
| Example 10 | 41.2 | 23.1 | 4106 | 4.0360773 |
| Comparative Example 11 | 38 | 20 | 4214 | 3.968046506 |
| Comparative Example 12 | 35.3 | 22.5 | 4761 | 3.95088589 |
| Comparative Example 13 | 38.2 | 22.1 | 4210 | 3.972764628 |
| Comparative Example 14 | 34.2 | 23.6 | 5033 | 3.947220003 |
| Comparative Example 15 | 33.5 | 23.8 | 5278 | 3.951556803 |
| Comparative Example 16 | 33.4 | 24.1 | 5306 | 3.951442002 |
| Comparative Example 17 | 39.2 | 19.8 | 3940 | 3.970959828 |
| Comparative Example 18 | 42.9 | 11.9 | 3216 | 3.98650003 |
| Comparative Example 19 | 39.9 | 15.8 | 3876 | 3.981816916 |
| Comparative Example 20 | 36.7 | 22.3 | 3987 | 3.911407336 |

Referring to Table 2, the crosslinked polymer obtained by mixing the laponite colloidal solution with the monomer composition and polymerizing and internally crosslinking it according to the preparation method of the present invention satisfied the GSI range of 4.00 or more, whereas the case where a positively charged laponite is not contained, or it is added in the form of a powder rather than the form of a colloidal solution, or Comparative Examples having a laponite content outside the range of 0.02 to 0.09 relative to the monomer composition, exhibited a GSI of less than 4.00.

In addition, referring to FIG. 1, Examples showed higher gel strength at similar centrifuge retention capacity as compared with the crosslinked polymers of Comparative Examples, which proves that according to the present invention, the centrifuge retention capacity and the gel strength can be improved at the same time.

Referring to Table 3 and FIG. 2, such a tendency could be maintained even after the surface crosslinking reaction and thus, it is expected that according to the present invention, a super absorbent polymer having excellent physical properties can be provided.

What is claimed is:

1. A method for preparing a super absorbent polymer comprising:
preparing a monomer composition containing a water soluble ethylenically unsaturated monomer, an internal crosslinking agent, and a polymerization initiator;
mixing the monomer composition with a laponite colloidal solution containing 0.02 to 0.09 part by weight of a positively charged laponite based on 100 parts by weight of the monomer composition to form a mixture of the monomer composition and the lapnotie colloidal solution; and
thermally polymerizing or photo-polymerizing the mixture of the monomer composition and the laponite colloidal solution to form a crosslinked polymer.

2. The method for preparing a super absorbent polymer according to claim 1, wherein the laponite colloidal solution includes laponite in the concentration of 0.5% to 10% by weight.

3. The method for preparing a super absorbent polymer according to claim 1, wherein the laponite colloidal solution has a viscosity of 1.2 to 10 cps at 25° C.

4. The method for preparing a super absorbent polymer according to claim 1, wherein a charge amount of the laponite is 1 to 10 mmol/100 g.

5. The method for preparing a super absorbent polymer according to claim 1, wherein the positively charged laponite includes at least one of Laponite XLG, Laponite RD, Laponite EP, Laponite XL21, or Laponite D.

6. The method for preparing a super absorbent polymer according to claim 1, wherein the crosslinked polymer satisfies the following Formula 1:

$$4.00 \leq GSI(\text{Gel strength index}) \leq 4.20 \quad \text{[Formula 1]}$$

wherein, GSI=(gel strength of the crosslinked polymer (unit: Pa)+9,750*ln (centrifuge retention capacity (CRC, unit: g/g) measured according to EDANA method WSP 241.3)/10,000.

7. The method for preparing a super absorbent polymer according to claim 6, wherein the crosslinked polymer has a centrifuge retention capacity (CRC) of 35 to 45 g/g, measured according to EDANA method WSP 241.3.

8. The method for preparing a super absorbent polymer according to claim 6, wherein the crosslinked polymer has a gel strength of 2,500 to 5,000 Pa.

9. The method for preparing a super absorbent polymer according to claim 1, wherein the crosslinked polymer has an absorption under pressure (AUP) of 20 to 30 g/g, measured under 0.7 psi according to EDANA method WSP 242.3.

10. The method for preparing a super absorbent polymer according to claim 1, wherein the internal crosslinking agent is polyethylene glycol diacrylate.

11. A super absorbent polymer comprising: a crosslinked polymer formed by polymerizing a mixture of a monomer composition containing a water soluble ethylenically unsaturated monomer, an internal crosslinking agent, and a polymerization initiator; and a laponite colloidal solution containing 0.02 to 0.09 part by weight of a positively charged laponite based on 100 parts by weight of the monomer composition.

12. The super absorbent polymer according to claim 11, wherein the crosslinked polymer satisfies the following Formula 1:

$$4.00 \leq GSI(\text{Gel strength index}) = 4.20 \quad \text{[Formula 1]}$$

wherein, GSI=(gel strength of the crosslinked polymer (unit: Pa)+9,750*ln (centrifuge retention capacity (CRC, unit: g/g) measured according to EDANA method WSP 241.3)/10,000.

13. The super absorbent polymer according to claim 12, wherein the crosslinked polymer has a centrifuge retention capacity (CRC) of 35 to 45 g/g, measured according to EDANA method WSP 241.3.

14. The super absorbent polymer according to claim 12, wherein the crosslinked polymer has a gel strength of 2,500 to 5,000 Pa.

15. The super absorbent polymer according to claim 11, wherein the crosslinked polymer has an absorption under pressure (AUP) of 20 to 30 g/g, measured under 0.7 psi according to EDANA method WSP 242.3.

16. The super absorbent polymer according to claim 11, wherein the internal crosslinking agent is polyethylene glycol diacrylate.

17. The super absorbent polymer according to claim 11, wherein a charge amount of the positively charged laponite is 1 to 10 mmol/100 g.

18. The super absorbent polymer according to claim 11, wherein the positively charged laponite includes at least one Laponite XLG, Laponite RD, Laponite EP, Laponite XL21, or Laponite D.

19. The super absorbent polymer according to claim 11, further comprising a surface crosslinked layer formed on the surface of the crosslinked polymer.

* * * * *